United States Patent
Nishida et al.

(10) Patent No.: US 6,704,038 B2
(45) Date of Patent: Mar. 9, 2004

(54) LIGHT DEFLECTING APPARATUS

(75) Inventors: Hideyuki Nishida, Kanagawa (JP); Michihiro Kugioka, Kanagawa (JP); Mikio Nakasugi, Shizuoka (JP); Masayoshi Asami, Chiba (JP); Ichiro Maekawa, Kanagawa (JP); Nobuo Nakajima, Chiba (JP); Hiromasa Masuda, Kanagawa (JP)

(73) Assignees: Canon Seiki Kabushiki Kaisha, Tokyo (JP); Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/956,224

(22) Filed: Sep. 20, 2001

(65) Prior Publication Data

US 2002/0037116 A1 Mar. 28, 2002

(30) Foreign Application Priority Data

Sep. 27, 2000 (JP) .......................... 2000-293309
Oct. 25, 2000 (JP) .......................... 2000-324881

(51) Int. Cl.$^7$ .............................................. B41J 27/00
(52) U.S. Cl. ........................................ 347/261; 347/243
(58) Field of Search .................... 347/243, 259, 347/260, 261; 310/254, 258, 261, 90, 90.5; 322/49, 51, 52; 29/898.02; 59/598

(56) References Cited

U.S. PATENT DOCUMENTS

| | | | |
|---|---|---|---|
| 5,270,737 A | 12/1993 | Nakasugi et al. | 347/260 |
| 5,822,846 A * | 10/1998 | Moritan et al. | 29/598 |
| 6,242,830 B1 * | 6/2001 | Katagiri | 310/90 |
| 6,307,293 B1 * | 10/2001 | Ichiyama | 310/90.5 |
| 6,397,470 B1 * | 6/2002 | Saichi et al. | 29/898.02 |

FOREIGN PATENT DOCUMENTS

| | | | | |
|---|---|---|---|---|
| JP | 6-311696 | | 11/1994 | |
| JP | 8-75011 | | 3/1996 | |
| JP | 2000-60064 | * | 2/2000 | H02K/7/08 |

* cited by examiner

Primary Examiner—Hai Pham
(74) Attorney, Agent, or Firm—Fitzpatrick, Cella, Harper & Scinto

(57) ABSTRACT

A dynamic pressure bearing apparatus having high performance and excellent stability without hindering operations of appliances due to a leaked oil, the dynamic pressure bearing apparatus including: a rotating shaft inclined in a predetermined direction from a vertical direction; a sleeve rotatably supporting the rotating shaft; an operating fluid for generating a dynamic pressure, the operating fluid being filled in a gap formed between the sleeve and the rotating shaft; and a capturing device for capturing the operating fluid leaked from the gap, the capturing device being disposed on an outside surface of the sleeve in the predetermined direction.

9 Claims, 10 Drawing Sheets

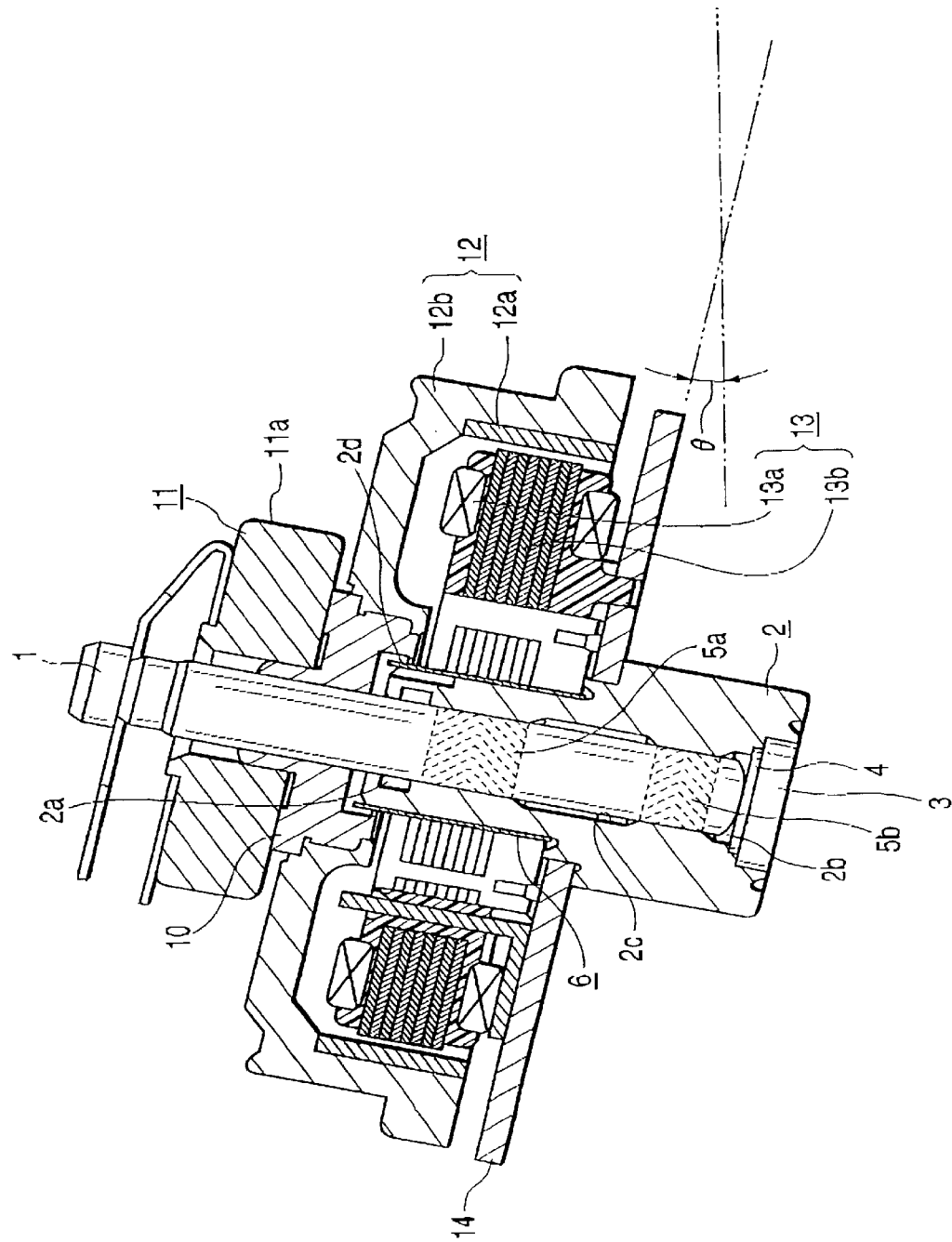

FIG. 3A
FIG. 3B
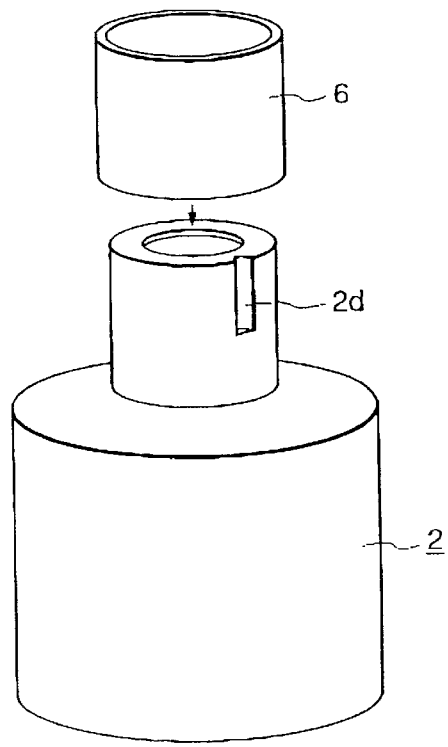
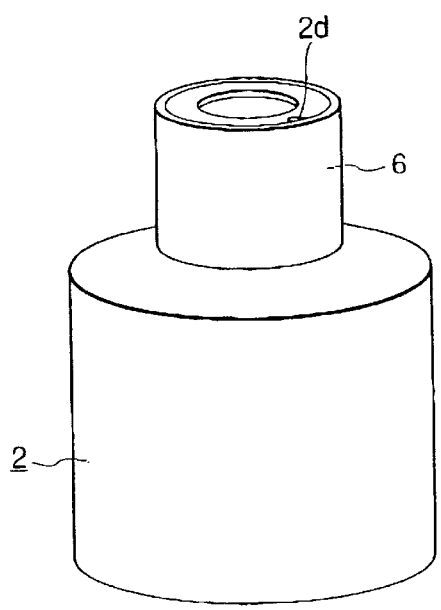
FIG. 4
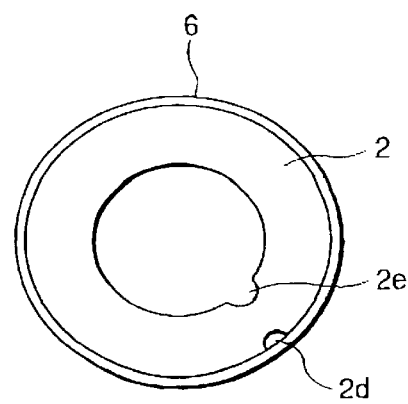

LIGHT DEFLECTING APPARATUS

BACKGROUND OF THE INVENTION

1. Field of the Invention

The present intention relates to a dynamic pressure bearing apparatus, and more specifically a dynamic pressure bearing apparatus which is suited for use in a light deflecting apparatus such as a laser beam printer or a bar-code reader.

2. Related Background Art

A laser beam printer or a bar-code reader uses a light deflecting apparatus for scanning a medium to be scanned with a laser beam. In such a light deflecting apparatus a rotating polyhedral mirror which is rotated at a high speed is attached to a rotating shaft rotatably supported by a bearing Conventional bearing frequently used as such a bearing is a dynamic pressure bearing which can rotate stably and smoothly. Furthermore, dynamic pressure bearings are used widely in information storage appliances such as optical disks, magnetic disks and the like as a bearing for supporting a disk rotating at a high speed.

FIG. 1 is a schematic sectional view showing an example of main members of a conventional light deflecting apparatus such as that described above. In FIG. 1, a rotating shaft 101 is rotatable supported in a bearing slot formed in a sleeve 102. At a lower end of the sleeve 102, a fixed plate 103 is fixed to seal the above-described bearing slot and a thrust plate 104 is disposed on the fixed plate 103. Between an inside surface of the bearing slot of the sleeve 102 and an outside surface of the rotating shaft 101 and between the thrust plate 104 and an end surface of the rotating shaft 101, oil is filled as an operating fluid for generating a dynamic pressure. Furthermore, the end surface of the rotating shaft 101 is made of a material having low frictional resistance and composes a thrust bearing together with the thrust plate 104.

A flange member 110 is fixed to an upper portion of the rotating shaft 101. A rotating polyhedral mirror 111 having a reflecting surface 111a is mounted on the flange member 110. This rotating polyhedral mirror is pressed by a pressing spring so as to be coupled integrally with the flange member 110 and a rotor 112.

The rotor 112 has a permanent magnet 112a and a yoke 112b supporting the permanent magnet 112a. On the other hand, a circuit board 114 is fixed to the sleeve 102 and a stator core 113b of a stator 113 is erected and supported on the circuit board 114. A stator coil 113a wound around the stator core 113b is opposed to the permanent magnet 112a of the rotor 112, and a motor which rotatingly drives the rotating polyhedral mirror 111 is composed of the stator coil 113a and the permanent magnet 112a.

An oil reservoir 102a is formed on a top end portion of the bearing slot of the sleeve 102, thereby reserving a redundancy for rampage of a liquid surface of the oil in the bearing slot. Furthermore, large-diameter portions are formed also at the lower end portion and in a middle portion of the sleeve 102 so as to form relief portions 102b and 102c for reducing a loss of a dynamic pressure of the oil. Furthermore, herringbone dynamic pressure generating grooves 105a and 105b are formed on an outer circumferential surface of the rotating shaft 101 between the oil reservoir 102a at the top end and the relief portion 102c in the middle portion and between the relief portion 102c in the middle portion and the relief portion 102b at the lower end, respectively A spiral groove (not shown) is formed on a top surface of the thrust plate 104. An upper end of the rotating shaft 101 protrudes higher than the bearing slot of the sleeve 102 to compose a coupled portion of the rotating polyhedral mirror 111 together with the flange member 110.

When the rotating shaft 101 rotates in the dynamic pressure bearing apparatus which is configured as described above, a dynamic pressure is generated in the oil by a function of the dynamic pressure generating grooves 105a and 105b formed in the bearing slot of the sleeve 102 and the rotating shaft 101 is rotated in a condition where the rotating shaft 101 is not in contact with the bearing slot of the sleeve 102. Also in a thrust direction, a dynamic pressure is generated by a function of a spiral groove formed on the thrust plate 104, whereby the rotating shaft 101 is supported in a floated condition.

In case of using a liquid such as oil as an operating fluid for a dynamic pressure bearing, however, the above-described conventional technology may allow air to be involved in the operating fluid when the sleeve 102 is fitted over the shaft 101 at an initial assembling step of the production. When the apparatus is heated by rotation or installed at a location kept at a low pressure such as a highland, if the involved air is stagnant in a large amount in the relief portions 102b and 102c, the involved air penetrates from the relief portions 102b and 102c into a bearing gap of the dynamic pressure bearing. As a result, the air which is formed into bubbles may carry out the oil when the air is exhausted outside from an opening of the bearing.

When the oil leaks out from the opening of the bearing as described above in a condition of use where a light deflecting apparatus is repeatedly started and stopped, the oil goes along the flange member 110 and the yoke 112b, and is splashed by centrifugal forces generated by rotations of the flange member 110 and the yoke 112b, thereby posing a problem to cause malfunctions of appliances In order to solve a problem as described above, Japanese Patent Application Laid-Open No. 6-311696 discloses a method for providing a rotating shaft with an oil leakage preventive member. Furthermore, Japanese Patent Application Laid-Open No. 8-75011 discloses a method for disposing an oil absorbing sheet which absorbs leaked oil.

However, both the methods described above have problems of showing an insufficient leakage preventive effect and making assembling steps complicate.

SUMMARY OF THE INVENTION

An object of the present invention is to solve the problems of the above-described prior art and provide a dynamic pressure bearing apparatus having high performance and excellent stability without hindering operations of appliances due to leaked oil.

An object of the present invention is to provide a dynamic pressure bearing apparatus comprising:

a rotating shaft inclined in a predetermined direction from a vertical direction;

a sleeve rotatably supporting the rotating shaft;

an operating fluid for generating a dynamic pressure, the operating fluid being filled in a gap formed between the sleeve and the rotating shaft; and capturing means for capturing the operating fluid leaked from the gap, the capturing means being disposed on an outside surface of the sleeve in the predetermined direction.

Another object of the present invention is to provide a rotating apparatus comprising the dynamic pressure bearing apparatus as described above and a motor for rotating the rotating shaft.

Still another object of the present invention is to provide a light deflecting apparatus comprising the rotating apparatus as described above and a rotating polyhedral mirror attached to the rotating shaft.

A further object of the present invention is to provide a laser beam printer comprising a light source for emitting a laser beam, the above-described light deflecting apparatus for deflecting the laser beam emitted from the light source a photosensitive member and a scanning lens for condensing on the photosensitive member the laser beam deflected by the light deflecting apparatus.

BRIEF DESCRIPTION OF THE DRAWINGS

FIG. 2 is a schematic sectional view showing a first embodiment wherein a dynamic pressure bearing apparatus according to the present invention is applied to a light deflecting apparatus;

FIGS. 3A and 3B are schematic perspective views explaining the assembly of capturing means in the first embodiment;

FIG. 4 is a top view showing a modification example of the first embodiment wherein an inner groove is formed in an inside surface of a sleeve;

DESCRIPTION OF THE PREFERRED EMBODIMENTS

Figure 1:
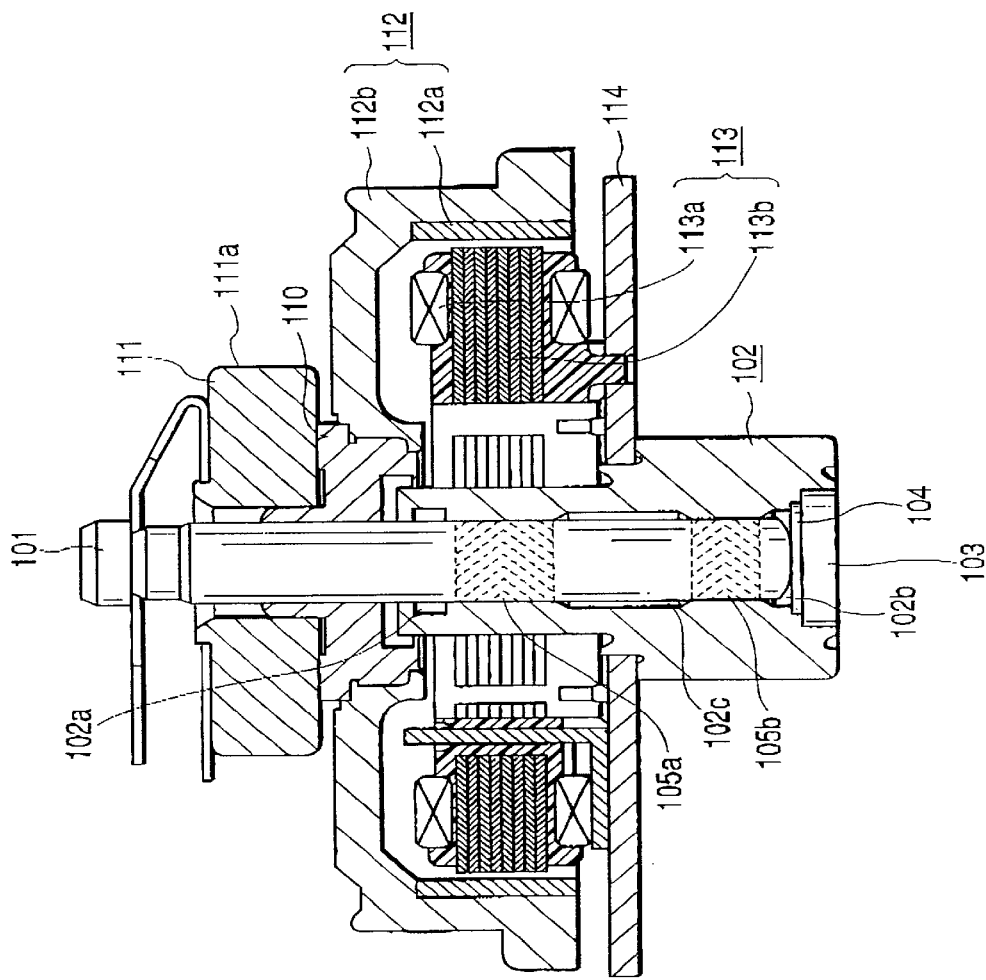
FIG. 1 is a schematic sectional view showing an example of the main part of a conventional light deflecting apparatus.

Now, embodiments of the present invention will be described detailedly with reference to the accompanying drawings.

FIG. 2 is a schematic sectional view showing a first embodiment wherein a dynamic pressure bearing apparatus according to the present invention is applied to a light deflecting apparatus. In the first embodiment, a rotating polyhedral mirror 11 having a reflecting surface 11a for deflecting and scanning a light beam is rotatingly driven by a motor.

In FIG. 2, a rotating shaft 1 is integrally attached to a rotor 12 consisting of a permanent magnet 12a and a yoke 12b, and the rotating polyhedral mirror 11 by way of a flange member 10. On the other hand, a sleeve 2 is fixed a circuit board 14, which is integrally coupled with a stator 13 consisting of a stator coil 13a and a stator core 13b.

The stator core 13b has multi-polar pole shoes, around each of the pole shoes a stator coil 13a is wound. A current supply is consecutively switched depending on a rotating position of the permanent magnet 12a magnetized in multiple poles, thereby generating a rotating force between the rotor 12 and the stator 13.

The stator core 13b around which the stator coil 13a is wound is fixed to a circuit board 14 together with circuit parts which compose a driving circuit. The sleeve 2 is fixed to the circuit board 14. These rotor section and stator section are manufactured individually and assembled into a motor as a whole. At this time, a defined amount of oil is filled into the sleeve 2 with an oiling apparatus as an operating fluid for generating a dynamic pressure and then the rotating shaft 1 is inserted into the sleeve 2 to complete the motor.

A bearing section of the above-described motor comprises the rotating shaft 1 and the sleeve 2 which rotatably supports the rotating shaft 1 in a bearing slot. Fixed to a lower end of the sleeve 2 is a fixed plate 3 which seals the above-described bearing slot and a thrust plate 4 is disposed on the fixed plate 3. The oil is filled as the operating fluid for generating the dynamic pressure between an inside surface of the bearing slot of the sleeve 2 and an outside surface of the rotating shaft 1 and between the thrust plate 4 and an end surface of the rotating shaft 1. Furthermore, the end surface of the rotating shaft 1 is made of a material having a low frictional resistance and composes a thrust bearing together with the thrust plate 4.

An oil reservoir 2a is formed on a top end portion of the bearing slot of the sleeve 2. Furthermore, large-diameter portions having an inside diameter larger than that of other portions are formed at a lower end portion and in a middle portion of the bearing slot so as to form relief portions 2b and 2c. Between the oil reservoir 2a at the top end and the relief portion 2c in the middle portion and between the relief portion 2c in the middle portion and the relief portion 2b at the lower end, herringbone dynamic pressure generating grooves 5a and 5b are formed on an outer circumferential surface of the rotating shaft 1. Furthermore, a spiral groove (not shown) is formed on a top surface of the thrust plate 4.

When the rotating shaft 1 rotates in the dynamic pressure bearing which is configured as described above, a dynamic pressure is generated in the oil by a function of the dynamic pressure generating grooves 5a and 5b formed in the bearing slot of the sleeve 2, whereby the rotating shaft 1 is rotated in a condition of not being in contact with the bearing slot of the sleeve 2. Also, in a thrust direction, a dynamic pressure is generated by a function of the spiral groove formed on the thrust plate 4, whereby the rotating shaft 1 is supported in a floated state.

The light deflecting apparatus used in the first embodiment is disposed and inclined at an inclination angle θ in a predetermined direction when the apparatus is attached to a housing (stay), for supporting a scanning lens of a laser beam printer described later. The inclination angle θ is determined depending on sizes of a scanner optical system, a machine and the like of a kind of the laser beam printer, and is optionally set within a range of an angle from 0° to 90° relative to a horizontal plane. In other words, the rotating shaft 1 is disposed and inclined at the inclination angle θ in a predetermined direction from a vertical direction.

When the rotating shaft 1 is disposed in the condition of inclining it at the inclination angle θ as described above, when the oil for generating the dynamic pressure leaks, it always leaks from a predetermined location of an opening of a sleeve in an inclined direction of the sleeve. In the first embodiment, an outer groove 2d is formed on an outside surface of the sleeve at this location. Furthermore, a cylindrical ring 6 as a cylindrical member is assembled with the outer circumferential surface of the sleeve 2 so as to surround the outer groove 2d. The oil leaking from the opening at a top end of the sleeve 2 is captured by a space which is formed between the outer groove 2d and the ring 6.

That is, in the first embodiment, the means for capturing the oil leaking from a bearing gap of the sleeve 2 consists of the cylindrical ring 6 and the outer groove 2d formed on the outer circumferential surface of the sleeve 2. FIGS. 3A and 3B are schematic perspective views descriptive of assembly of the capturing means. The ring 6 is inserted from the upside of the sleeve 2 and fitted to the sleeve 2 in its axial direction as shown in FIG. 3A and assembled as shown in FIG. 3B.

Though the outer groove 2d is usually formed by cutting work with an end mill or the like, the outer groove 2d can be formed by a forging method or etching which is chemical means. Furthermore, the ring 6 is made of a metal, resin or the like. When the ring 6 is made of a metal material, the ring 6 may have an inside diameter a little smaller than an outside diameter of an upper portion of the sleeve 2 and be assembled by shrinkage fit. When the ring 6 is made of a resin material, the ring 6 may be press fitted or dropped in, and then fixed while sealing the ring 6 along a circumference of a bottom surface of the ring 6.

At a step of fixing the sleeve 2 configured as described above to a circuit board 14, it is not to be forgotten to dispose the sleeve 2 so that the outer groove 2d is located on the outside surface in the inclined direction which is the definite location from which leaked amount of the oil flowing out through the opening of the sleeve 2 inclined at the inclination angle θ flows out under gravity.

When the oil leaks from the opening of the sleeve 2 for a cause described with reference to the conventional example, the oil which overcomes a surface tension of the oil exerted between the opening of the sleeve 2 and the shaft 1 and cannot be held starts leaking. In the first embodiment wherein the dynamic pressure bearing apparatus is inclined at the inclination angle θ as a whole, the leaked oil flows out in the inclined direction of the apparatus, that is rightward in FIG. 2, under an influence due to the gravity. Since the capturing means composed of the ring 6 and the outer groove 2d formed on the outer circumferential surface of the sleeve 2 is disposed beyond the sleeve, a leaked amount of the oil is captured by the capturing means. Accordingly, the first embodiment does not allow the oil to flow outside the bearing and contaminate peripheral appliances, thereby eliminating malfunctions like the conventional example.

It is desirable to configure the above-described ring 6 so as to have a top end portion which protrudes upward from the top end of the sleeve 2. When the ring 6 is configured as described above, it is possible to prevent the oil from leaking from another portion of the opening of the sleeve 2.

Furthermore, an inner groove 2e may be formed on an inside surface of the sleeve 2, that is, on a side of an inside diameter of the opening, so as to oppose to the outer groove 2d as shown in FIG. 4. FIG. 4 is a top view showing a relation between the sleeve 2 and the ring 6. When the sleeve 2 and the ring 6 are disposed as shown in FIG. 4, the oil adhering to the opening of the sleeve 2 is liable to be collected into the inner groove 2e owing to the surface tension and flow out toward the outer groove 2d owing to the influence due to the gravity produced by the inclination angle θ in addition to the surface tension. The oil can be captured without fail by guiding the oil which is to be captured by the outer groove 2d so as to be collected through a shortest path into the outer groove 2d as described above.

Figure 5A:
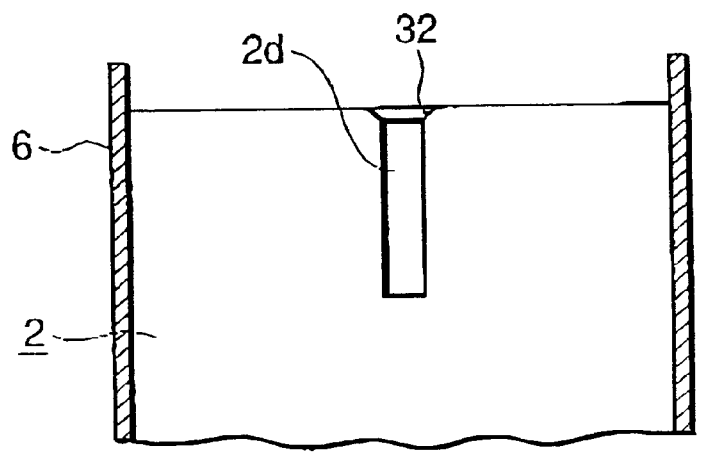
FIGS. 5A and 5B are schematic side views showing a modification example of the first embodiment wherein a top end of an outer groove of a sleeve is chamfered.
Figure 5B:
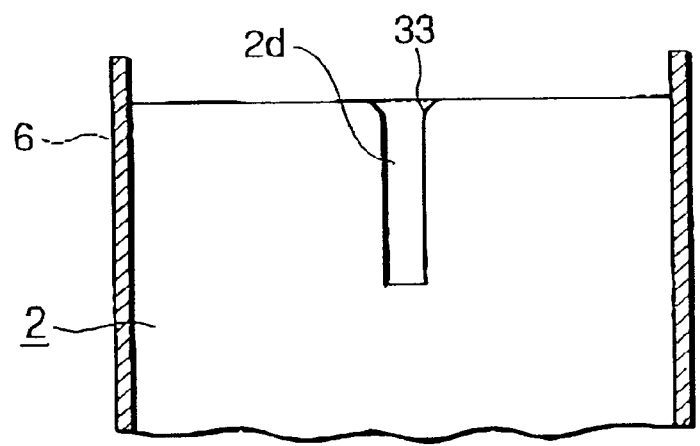

By making a chamfering work 32 on a top end of the outer groove 2d of the sleeve 2 as shown in FIG. 5A, it is further possible to prevent the oil from being stagnant on the top end of the sleeve 2 in an adhering condition, thereby being captured smoothly. Such a working is not limited to the above-described chamfering work and may be the so-called round chamfering 33 which rounds the top end as shown in FIG. 5B.

Figure 6A:
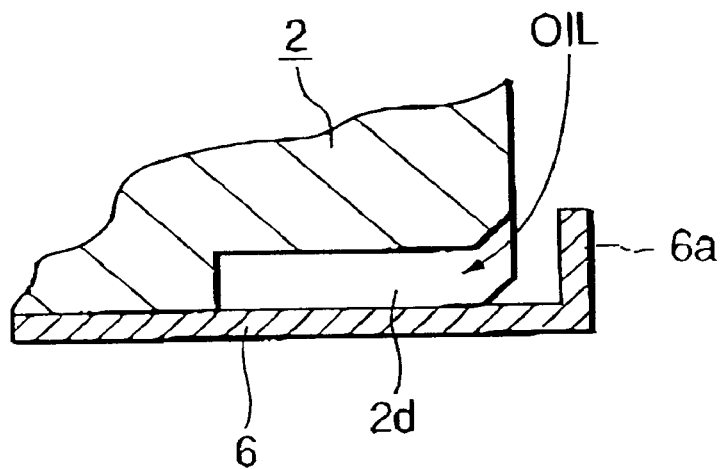
FIGS. 6A and 6B are schematic sectional views showing a modification example of the first embodiment wherein a bent portion is formed on a top end of a ring.
Figure 6B:
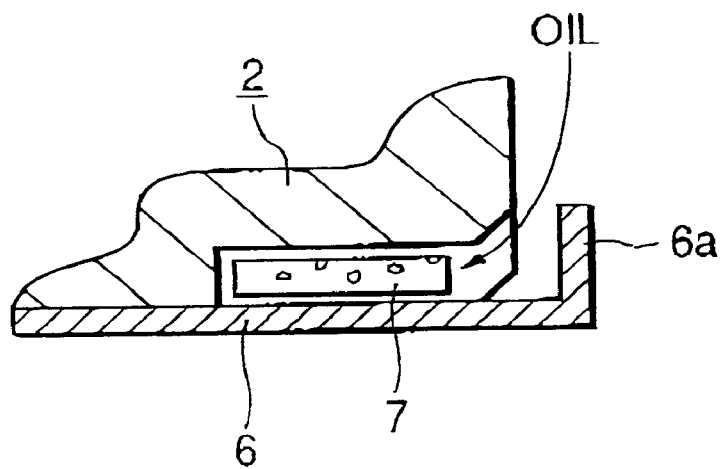

In a condition where the inclination angle θ is close to 90°, a bent portion 6a may be formed at a top end of the ring 6 as shown in FIG. 6A, thereby narrowing an inlet opening so that the captured oil does not flow out once again. Furthermore, an oil capturing member 7 such as cotton or sponge which absorbs the oil may be disposed in the capturing means as shown in FIG. 6B.

The first embodiment makes it possible to effectively capture oil which has leaked out through an opening of a sleeve in a condition of use where a rotating apparatus for rotatingly driving a rotating polyhedral mirror is repeatedly started and stopped. Accordingly, the first embodiment makes it possible to prevent oil from being splashed and avoid contamination of a circuit board and malfunctions of other appliances due to leaked oil, thereby making it possible to realize a dynamic pressure bearing apparatus which is inexpensive, excellent in durability and high in performance without using expensive members such as an oil absorbing sheet.

Figure 7:
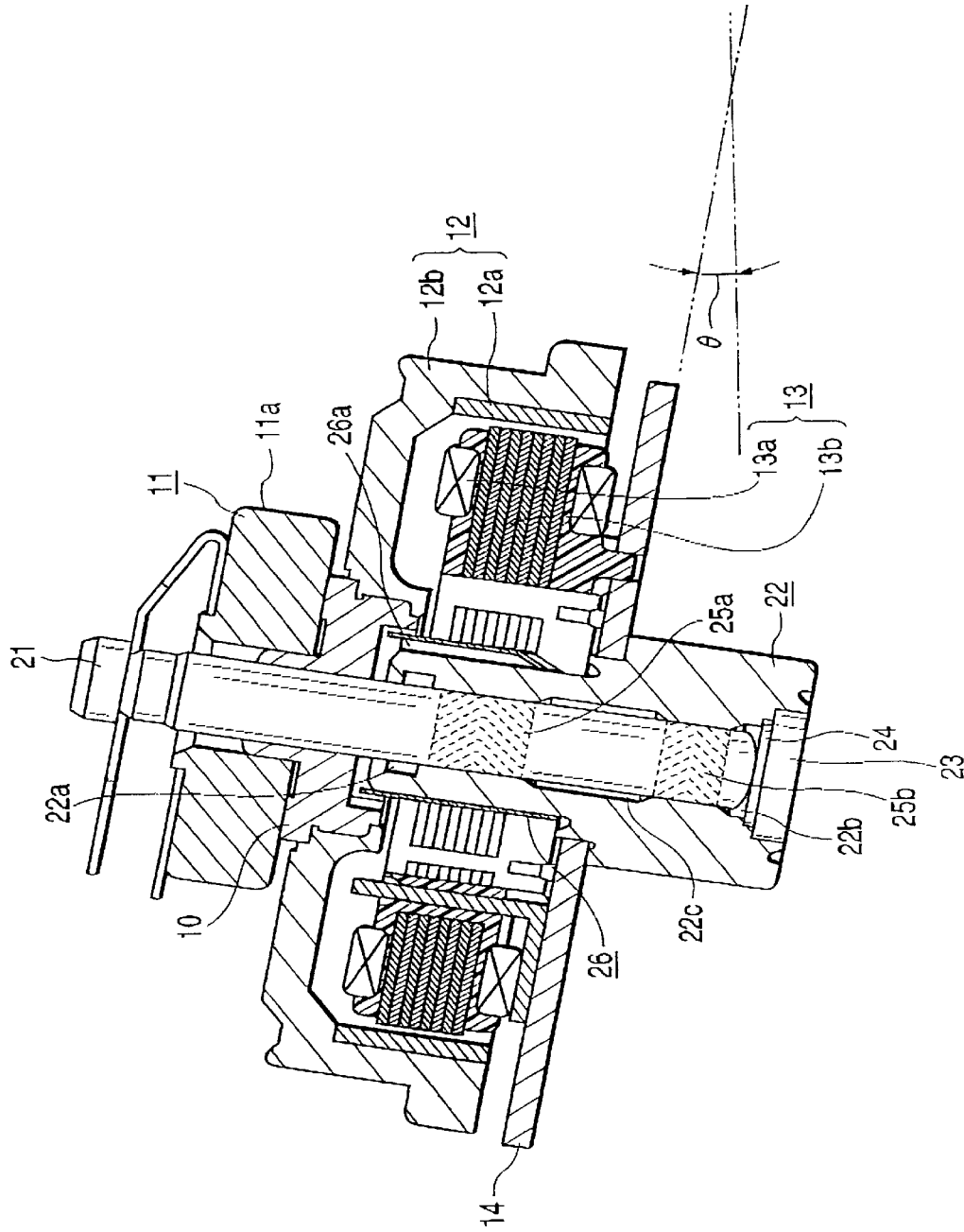
FIG. 7 is a partially schematic sectional view showing a second embodiment wherein the dynamic pressure bearing apparatus according to the present invention is applied to a light deflecting apparatus.

FIG. 7 is a schematic sectional view showing a second embodiment wherein the dynamic pressure bearing apparatus according to the present invention is applied to a light deflecting apparatus. In FIG. 7, members which are the same as those shown in FIG. 2 are denoted by the same reference numerals with no description in particular.

A bearing section shown in FIG. 7 consists of a rotating shaft 21 and a sleeve 22 which rotatably supports the rotating shaft 21 in a bearing slot. Fixed to a lower end of the sleeve 22 is a fixed plate 23 for sealing the above-described bearing slot and a thrust plate 24 is disposed on the fixed plate 23. Oil is filled as an operating fluid for generating a dynamic pressure between an inside surface of the bearing slot of the sleeve 22 and an outside surface of the rotating shaft 21 and between the thrust plate 24 and an end surface of the rotating shaft 21. Furthermore, the end surface of the rotating shaft 21 is made of a material having a low frictional resistance and composes a thrust bearing together with the thrust plate 24.

An oil reservoir 22a is formed on a top end portion of the bearing slot of the sleeve 22. Furthermore, large-diameter portions having an inside diameter larger than that of other portions are formed at a lower end portion and a middle portion of the bearing slot so that the large-diameter portions serve as relief portions 22b and 22c. Between the oil reservoir 22a at the top end and the relief portion 22c at the middle portion and between the relief portion 22c at the middle portion and the relief portion 22b at the lower end respectively, herringbone dynamic pressure generating grooves 25a and 25b are formed on an outer circumferential surface of the rotating shaft 21. Furthermore, a spiral groove (not shown) is formed on a top surface of the thrust plate 24.

When the rotating shaft 21 rotates in the dynamic pressure bearing which is configured as described above, a dynamic pressure is generated in the oil by a function of the dynamic pressure generating grooves 25a and 25b formed in the bearing slot of the sleeve 22, whereby the rotating shaft 21 is rotated in a condition where the rotating shaft 21 is not in contact with the bearing slot of the sleeve 22. Also, in a thrust direction, a dynamic pressure is generated by a function of the spiral groove formed on the thrust plate 24, whereby the rotating shaft 21 is supported in a floated state.

In addition, a rotating polyhedral mirror 11 fixed to the shaft 21 by way of a flange member 10, a rotor 12 consisting of a permanent magnet 12a and a yoke 12b, a stator 23 consisting of a stator coil 13a and a stator core 13b, a circuit board 14 and the like which are similar to those in the first embodiment are denoted by the same reference numerals with no description in particular.

The light deflecting apparatus according to the second embodiment is disposed in a state inclined at an inclination angle θ in a predetermined direction when the apparatus is attached to a housing (stay) for supporting a scanning lens of a laser beam printer described later. The inclination angle θ is determined depending on sizes of a scanner optical system, a machine and the like of each kind of the laser beam printer, and is optionally set within a range of an angle from 0° to 90° relative to a horizontal plane. That is, the rotating shaft 21 is disposed at the inclination angle θ in a predetermined direction from a vertical direction.

If the rotating shaft 21 is disposed at the inclination angle θ, when oil as an operating fluid for generating a dynamic pressure leaks, it always leaks from a definite location of an opening of the sleeve toward the outside surface in the inclined direction of the sleeve. In the second embodiment, a ring 26 is used as a cylindrical member for surrounding the outer circumferential surface of the sleeve, a protruding portion 26a is formed on the ring 26, and the ring 26 is disposed on an outside surface of the above-described definite location of the sleeve 22. The oil leaking from the opening at the top end of the sleeve 22 is captured in a space inside the protruding portion 26a of the ring 26.

Figure 8A:
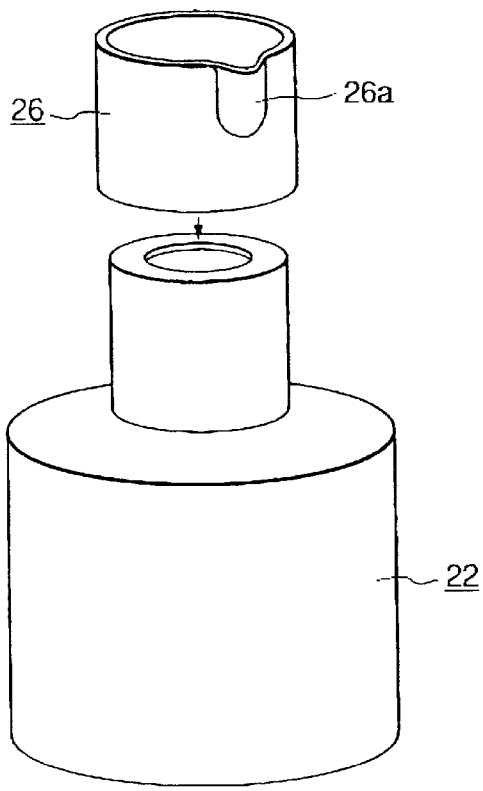
FIGS. 8A and 8B are schematic perspective views descriptive of assembly of capturing means in the second embodiment.
Figure 8B:
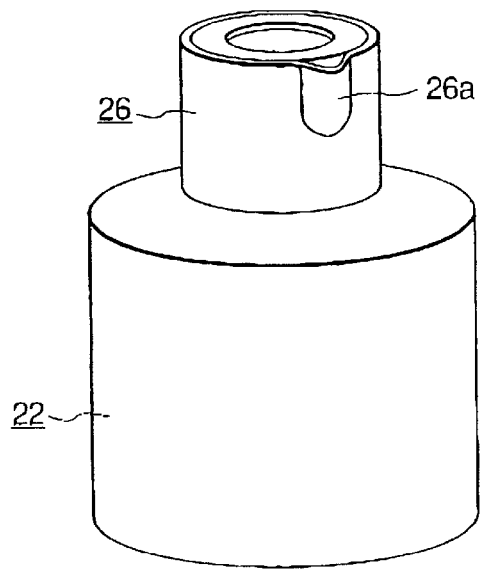

That is, means for capturing the oil leaking from a bearing gap of the sleeve 22 is composed in the second embodiment of a space formed between the protruding portion 26a formed on the cylindrical ring 26 and the outer circumferential surface of the sleeve 22. FIGS. 8A and 8B are schematic perspective views descriptive of assembly of the capturing means. The ring 26 is inserted in an axial direction from the upside of the sleeve 22 as shown in FIG. 8A and fitted to the sleeve 22 shown in FIG. 8B.

The ring 26 is made of a metal, resin or the like. When the ring 26 is made of a metal material, the ring 26 may have an inside diameter a little smaller than an outside diameter of an upper portion of the sleeve 22 and assembled by shrinkage fit. When the ring 26 is made of resin, the ring 26 may be press fitted or dropped in and then fixed while sealing the ring 26 along a circumference of a bottom surface of the ring 26.

In a step of fixing the sleeve 22 configured as described above to the circuit board 14, it is not to be forgotten to dispose the protruding portion 26a of the ring 26 at a definite location to which leaked amount of the oil flowing out through the opening of the sleeve 22 inclined at the inclination angle θ flows out under gravity.

When the oil leaks from the opening of the sleeve 22 for a reason as described with reference to the conventional example, the oil which overcomes a surface tension exerted between the opening of the sleeve 22 and the shaft 21 and cannot be held starts flowing. In the second embodiment wherein the light deflecting apparatus is disposed at the inclination angle θ as a whole, the leaked oil flows out in the inclination direction of the apparatus, that is, rightward in FIG. 7, under an influence of the gravity. Since the oil capturing means composed of the protruding portion 26a of the ring 26 is disposed at a position where the leaked oil flows out, the leaked amount of the oil is captured by this means. The second embodiment therefore prevents the oil from flowing outside the bearing and contaminating peripheral appliances, thereby eliminating malfunctions unlike the conventional example.

It is desirable that the above-described ring 26 has a long top end portion which protrudes upward from a top end of the sleeve 22. When the ring 26 is configured as described above, it is possible to prevent the oil from leaking out from another portion of the opening of the sleeve 22.

Figure 9:
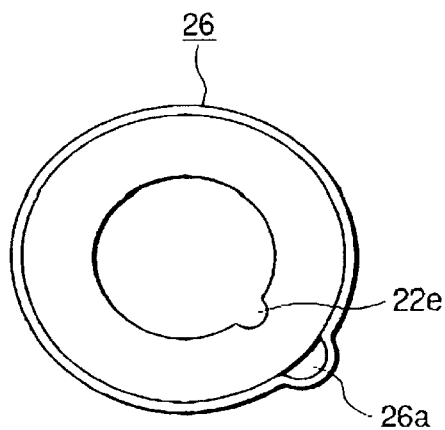
FIG. 9 is a top view showing a modification example of the second embodiment wherein an inner groove is formed in an inside surface of a sleeve.

Furthermore, an inner groove 22e may be formed on an inside surface of the sleeve 22, that is, on a side of an inside diameter of the opening, so as to oppose to the protruding portion 26a of the ring 26 as shown in FIG. 9. FIG. 9 is a top view showing a relation between the sleeve 22 and the ring 26. When the sleeve 22 is configured as described above, the oil which adheres to the opening of the sleeve 22 is liable to be collected in the inner groove 22e due to a surface tension and flow out toward the protruding portion 26a of the ring 26 by an influence of the gravity due to the inclination angle θ in addition to the surface tension. The oil can be captured without fail by leading the oil to be captured by the protruding portion 26a of the ring 26 so as to be collected through a shortest path.

Figure 10A:
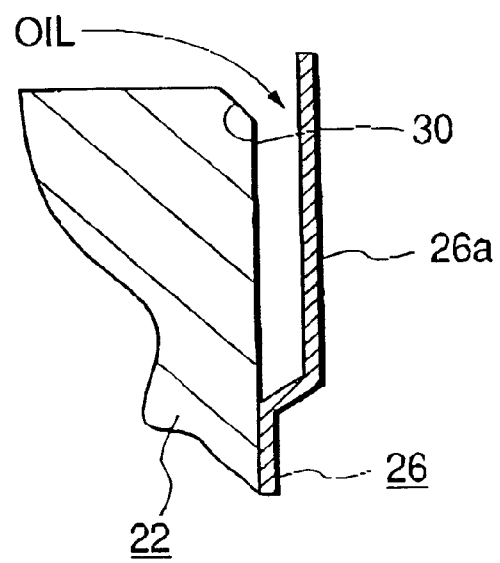
FIGS. 10A and 10B are schematic sectional views showing a modification example of the second embodiment wherein a top end of a sleeve is chamfered.
Figure 10B:
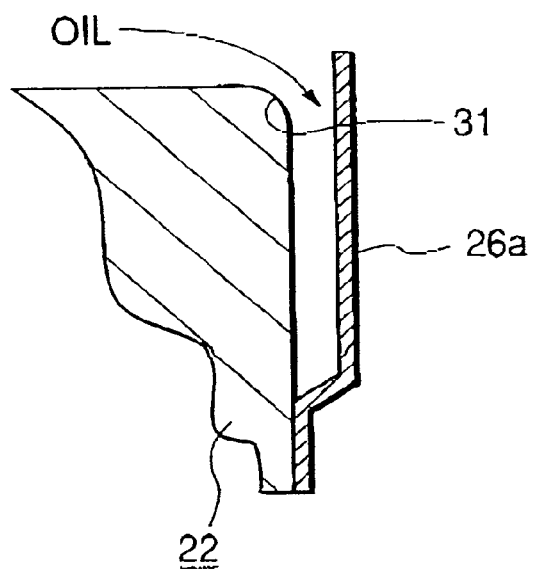

By making a chamfering work 30 on a top end of the sleeve 22 as shown in FIG. 10A, it is also possible to prevent the oil from being stagnant in a condition adhering to the top end of the sleeve 22, thereby capturing the oil smoothly. Such a work is not limited to the above-described chamfering and may be the so-called round chamfering 31 which rounds the top end as shown in FIG. 10B.

Figure 11A:
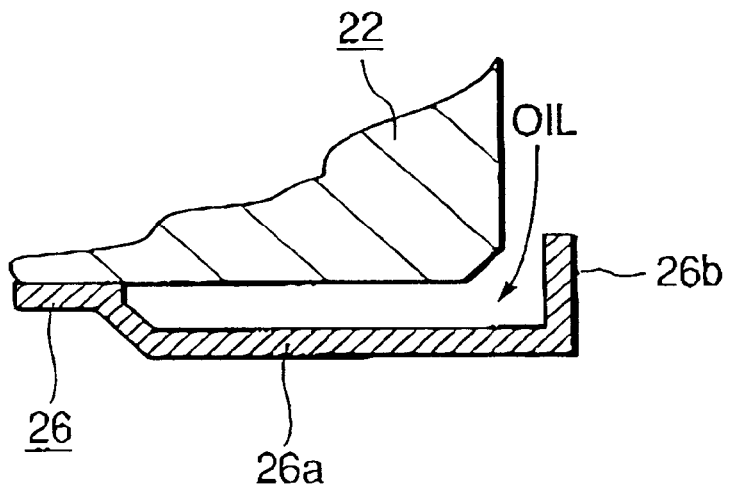
FIGS. 11A and 11B are schematic sectional views showing a modification example of the second embodiment wherein a bent portion is formed on a top end of a ring.
Figure 11B:
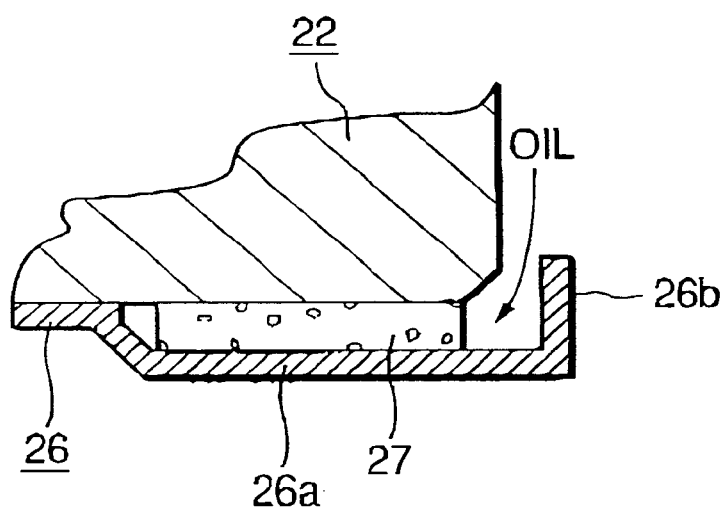

In a condition where the inclination angle θ is close to 90°, a bent portion 26a may be formed at a top end of the ring 26 so as to narrow an inlet opening as shown in FIG. 11A, whereby the captured oil does not flow out once again. Furthermore, an oil capturing member 27 absorbing the oil like cotton or sponge may be disposed in the capturing means as shown in FIG. 11B.

According to the second embodiment, it is possible to effectively capture oil which has leaked out through an opening of a sleeve in an use state that the rotating apparatus for rotatingly driving the rotating polyhedral mirror is repeatedly started and stopped. Accordingly, the second embodiment is capable of preventing oil from being splashed and avoiding contamination of a circuit board and malfunctions of other appliances due to leaked oil, thereby making it possible to realize a dynamic pressure bearing apparatus which is inexpensive, excellent in a durability and high in performance without using expensive members such as an oil absorbing sheet.

Figure 12:
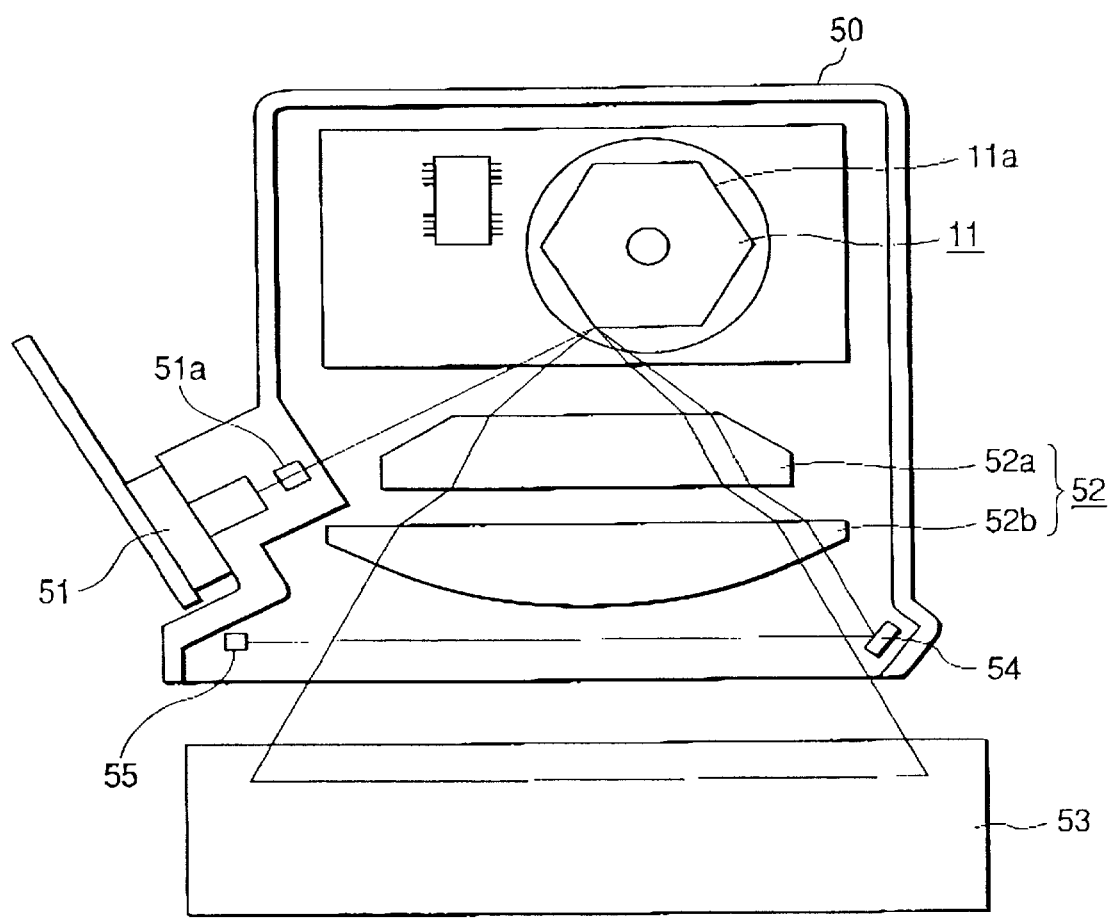
FIG. 12 is a schematic top view showing main members of a laser beam printer using the light deflecting apparatus shown in FIG. 2 or FIG. 7

FIG. 12 is a schematic top view showing main members of a laser beam printer using the light deflecting apparatus shown in FIG. 2 or FIG. 7. This printer comprises a light source 51 which emits a light beam (light bundle) such as a laser beam and a cylindrical lens 51a which linearly condenses the above-described light beam onto a reflecting surface 11a of a rotating polyhedral mirror 11, wherein the above-described light beam is deflected and scanned by rotating the rotating polyhedral mirror 11. The deflected light beam is imaged on a rotating drum like photosensitive member 53 by way of an imaging lens system 52 which is an imaging optical system. The imaging lens system 52 has a spherical lens 52a, a toric lens 52b and the like, and the so-called fθ function which corrects a scanning speed of a spot image to be imaged on the photosensitive member 53.

When the rotating polyhedral mirror 11 is rotated by a motor as described with reference to FIG. 2 or FIG. 7, the reflecting surface 11a is rotated at an even speed around an axial line of the rotating polyhedral mirror 11. An angle formed by an optical path of the light beam which is emitted from the light source 51 and condensed by the cylindrical lens 51a relative to a normal to the reflecting surface 11a of the rotating polyhedral mirror 11, that is, an incident angle of the light beam on the reflecting surface 11a is changed with elapse of time as the rotating polyhedral mirror 11 is rotated and an angle of reflection is similarly changed. Accordingly, a spot image formed by the light beam condensed on the photosensitive member 53 moves (scans) in an axial direction of the rotating drum (main scanning direction).

The imaging lens system 52 is designed so as to condense the light beam reflected by the rotating polyhedral mirror 11 into a spot image having a predetermined spot shape on the photosensitive member 53 and keep a scanning speed of the spot image constant in the main scanning direction.

The spot image imaged on the photosensitive member 53 forms an electrostatic latent image along with a main scanning by the rotation of the rotating polyhedral mirror 11 and a sub-scanning by rotation of the rotating drum like photosensitive member 53 around the axis of the photosensitive member.

Disposed around the photosensitive member 53 are a charging apparatus for uniformly charging a surface of the photosensitive member 53, a developing apparatus for visualizing the electrostatic latent image to be formed on the surface of the photosensitive member 53 into a toner image, a transferring apparatus for transferring the above-described toner image to a recording sheet (all not shown) and the like, and recording information is printed on the recording sheet by the light beam emitted from the light source 51.

At a location on the upstream side of the optical path in the main scanning direction for the light beam incident on a recording information write-in start position on a surface of the photosensitive member 53, a detecting mirror 54 reflects the light beam and leads it to a light-receiving surface of a light-receiving element 55 having a photodiode or the like. The light-receiving element 55 outputs a scanning start signal for detecting a scanning start position (write-out start position) when the light-receiving surface is irradiated with the above-described light beam.

The light source 51 emits a light beam corresponding to a signal given from a processing circuit which processes information from a host computer. The signal given to the light source 51 corresponds to information to be written into the photosensitive member 53, and the processing circuit gives to the light source 51 information corresponding to a scanning line which is a locus to be formed by the spot image imaged on the surface of the photosensitive member 53 as a unit. This information signal is transmitted in synchronization with the scanning start signal given from the light-receiving element 55.

In addition, the rotating polyhedral mirror 11, the imaging lens system 52 and the like are accommodated in an optical box 50, and the light source 51 is attached to a side surface of the optical box 50. After the rotating polyhedral mirror 11, the imaging lens system 52 and the like have been assembled in the optical box 50, a cover (not shown) is attached to an upper opening of the optical box 50.

Though the dynamic pressure bearing apparatus is applied to the light deflecting apparatus in the above-described embodiment, the dynamic pressure bearing apparatus according to the present invention is applicable to a turntable for rotating a disk at a high speed and other rotating apparatuses in information storage apparatus using as optical disks, magnetic disks and the like.

As described above, the present invention makes it possible to capture oil leaking from a bearing gap with an outside surface of a sleeve, thereby preventing leaked oil from contaminating a circuit board or the like and hindering operations of peripheral appliances. Accordingly, the present invention makes it possible to realize a dynamic pressure bearing apparatus which is capable of stably maintaining excellent bearing performance for a long time. Furthermore, use of the dynamic pressure bearing apparatus of the present invention makes it possible to upgrade performance and enhance a durability of a rotating apparatus such as a light deflecting apparatus and similar appliances which rotatingly drive a rotating polyhedral mirror and the like.

The present invention is variously modifiable in addition to the embodiments described above. The present invention includes all modification examples so far as the examples do not deviate from the scope of the claims.

What is claimed is:

1. A light deflecting apparatus inclined at an inclination angle in a predetermined direction from a vertical direction, comprising:
   a dynamic pressure bearing apparatus which comprises:
      a rotating shaft inclined at the inclination angle in the predetermined direction;
      a sleeve rotatably supporting said rotating shaft;
      operating fluid for generating a dynamic pressure, said operating fluid being filled in a gap formed between said sleeve and said rotating shaft; and
      capturing means for capturing said operating fluid leaked from the gap;
   a rotor fixed to said rotating shaft;
   a stator fixed to said sleeve; and
   a polyhedral mirror attached to said rotating shaft,
   wherein said capturing means comprises a groove formed on the outside surface of said sleeve and a cylindrical member covering said sleeve, and is disposed in the predetermined direction from the gap to capture said operating fluid leaked from the gap under gravity.

2. The light deflecting apparatus according to claim 1, wherein a chamfering work is made on a top end of the groove.

3. The light deflecting apparatus according to claim 1, wherein said capturing means further comprises an absorbing member absorbing said operating fluid disposed in the groove.

4. The light deflecting apparatus according to claim 1, wherein a top end of the cylindrical member protrudes from a top end of said sleeve.

5. A light deflecting apparatus inclined at an inclination angle in a predetermined direction from a vertical direction, comprising:
   a dynamic pressure bearing apparatus which comprises:
      a rotating shaft inclined at the inclination angle in the predetermined direction;
      a sleeve rotatably supporting said rotating shaft;
      a cylindrical member covering said sleeve;
      operating fluid for generating a dynamic pressure, said operating fluid being filled in a gap formed between said sleeve and said rotating shaft; and
      capturing means for capturing said operating fluid leaked from the gap;

a rotor fixed to said rotating shaft;

a stator fixed to said sleeve; and a polyhedral minor attached to said rotating shaft, wherein said capturing means comprises a protruding portion formed on said cylindrical member and is disposed in the predetermined direction from the gap to capture said operating fluid leaked from the gap under gravity.

6. The light deflecting apparatus according to claim 5, wherein said capturing means further comprises an absorbing member for absorbing said operating fluid, said operating fluid being disposed inside the protruding portion.

7. The light deflecting apparatus according to claim 5, wherein a top end of said cylindrical member protrudes from a top end of said sleeve.

8. The light deflecting apparatus according to claim 5, wherein a chamfering work is made on the top end of the groove.

9. A laser beam printer comprising:

a light source for emitting a laser beam;

a light deflecting apparatus according to any one of claims 1, 2 to 5, 6, 7 and 8 for deflecting the laser beam emitted from said light source;

a photosensitive member; and a scanning lens for condensing on said photosensitive member the laser beam deflected by said light deflecting apparatus.

* * * * *